(12) United States Patent
Van Zelst et al.

(10) Patent No.: US 8,594,216 B2
(45) Date of Patent: Nov. 26, 2013

(54) BEAMFORMING FEEDBACK OPTIONS FOR MU-MIMO

(75) Inventors: Albert Van Zelst, Woerden (NL); Sameer Vermani, San Diego, CA (US); Didier Johannes Richard Van Nee, De Meern (NL); Hemanth Sampath, San Diego, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/216,956

(22) Filed: Aug. 24, 2011

(65) Prior Publication Data

US 2012/0051408 A1 Mar. 1, 2012

Related U.S. Application Data

(60) Provisional application No. 61/377,023, filed on Aug. 25, 2010, provisional application No. 61/377,787, filed on Aug. 27, 2010.

(51) Int. Cl.
*H04K 1/10* (2006.01)
*H04L 27/28* (2006.01)

(52) U.S. Cl.
USPC ........... 375/260; 375/259; 375/219; 375/267; 375/227

(58) Field of Classification Search
USPC .......................... 375/219, 227, 267, 260, 259
See application file for complete search history.

(56) References Cited

U.S. PATENT DOCUMENTS

| | | | |
|---|---|---|---|
| 6,246,440 B1 | 6/2001 | Okamoto et al. |
| 6,303,423 B1 | 10/2001 | Lin |
| 6,362,012 B1 | 3/2002 | Chi et al. |
| 6,528,366 B1 | 3/2003 | Tu et al. |
| 6,767,788 B2 | 7/2004 | Kim |
| 7,062,414 B2 | 6/2006 | Waite et al. |
| 7,068,679 B1 | 6/2006 | Brown et al. |
| 7,071,054 B2 | 7/2006 | Park |

(Continued)

FOREIGN PATENT DOCUMENTS

| | | |
|---|---|---|
| EP | 1895680 A2 | 3/2008 |
| EP | 1983781 A1 | 10/2008 |

(Continued)

OTHER PUBLICATIONS

Banerjee, P., et al., "Nanotubular metal-insulator-metal capacitor arrays for energy storage", Nature Nanotechnology, vol. 4 Issue: 5 pp. 292-296, (2009).

(Continued)

*Primary Examiner* — Qutbuddin Ghulamali
(74) *Attorney, Agent, or Firm* — Patterson & Sheridan, LLP

(57) ABSTRACT

Beamforming may be used in MIMO communication systems to further enhance spectral efficiency. Beamforming refers to beamed transmissions to a single destination (e.g., a station) at a time, to enhance the rate and/or range of transmission. To perform beamforming from a source to one or more destinations, a channel and/or beamforming matrices corresponding to the channel needs to be known at the source, which may be obtained as feedback from the destination. However, the beamforming matrices may not be smooth over frequency as it is fed back from the destination. Therefore, certain aspects of the present disclosure provide beamforming feedback options, resulting in the smoothness of a beamforming matrix.

25 Claims, 11 Drawing Sheets

(56) References Cited

U.S. PATENT DOCUMENTS

| | | | |
|---|---|---|---|
| 7,129,580 | B1 | 10/2006 | Londergan et al. |
| 7,429,510 | B2 | 9/2008 | Das et al. |
| 7,539,253 | B2 | 5/2009 | Li et al. |
| 7,561,632 | B1 | 7/2009 | Van Zelst et al. |
| 7,564,914 | B2 | 7/2009 | Hansen et al. |
| 7,822,128 | B2 | 10/2010 | Maltsev et al. |
| 8,098,755 | B2 | 1/2012 | Kim et al. |
| 2002/0085336 | A1 | 7/2002 | Winer et al. |
| 2004/0043629 | A1 | 3/2004 | Lee et al. |
| 2004/0081131 | A1 | 4/2004 | Walton et al. |
| 2006/0024880 | A1 | 2/2006 | Chui et al. |
| 2006/0024904 | A1 | 2/2006 | Wilson |
| 2006/0049524 | A1 | 3/2006 | Lin et al. |
| 2006/0222097 | A1 | 10/2006 | Gupta et al. |
| 2007/0110183 | A1 | 5/2007 | Nagatani et al. |
| 2007/0213013 | A1 | 9/2007 | Kim |
| 2007/0223402 | A1* | 9/2007 | Waxman ............... 370/277 |
| 2008/0212461 | A1* | 9/2008 | Pande et al. ............ 370/203 |
| 2008/0311859 | A1 | 12/2008 | Ponnampalam et al. |
| 2008/0317156 | A1* | 12/2008 | Sivanesan et al. ........ 375/267 |
| 2009/0103666 | A1 | 4/2009 | Zhao et al. |
| 2009/0116581 | A1 | 5/2009 | Liau |
| 2009/0236691 | A1 | 9/2009 | Dyer et al. |
| 2009/0245375 | A1 | 10/2009 | Liu |
| 2009/0274237 | A1 | 11/2009 | Zelst et al. |
| 2009/0289724 | A1 | 11/2009 | Hu et al. |
| 2010/0025095 | A1 | 2/2010 | Guo et al. |
| 2010/0046599 | A1 | 2/2010 | Kim et al. |
| 2010/0230787 | A1 | 9/2010 | Guiraud et al. |
| 2010/0232527 | A1 | 9/2010 | Li et al. |
| 2010/0272201 | A1 | 10/2010 | Nakao et al. |
| 2011/0149374 | A1 | 6/2011 | Lan et al. |
| 2011/0176581 | A1 | 7/2011 | Thomas et al. |
| 2011/0210420 | A1 | 9/2011 | Lin |
| 2011/0217657 | A1 | 9/2011 | Flemming et al. |
| 2011/0260329 | A1 | 10/2011 | Seo |
| 2012/0002742 | A1 | 1/2012 | Cheng |
| 2012/0045003 | A1 | 2/2012 | Li et al. |
| 2012/0082193 | A1 | 4/2012 | Van Zelst et al. |
| 2012/0106603 | A1* | 5/2012 | Kim et al. ............... 375/219 |
| 2012/0121003 | A1 | 5/2012 | Kleider et al. |

FOREIGN PATENT DOCUMENTS

| | | |
|---|---|---|
| EP | 2423947 A2 | 2/2012 |
| WO | 2006102639 A1 | 9/2006 |
| WO | WO2010129550 A2 | 11/2010 |
| WO | WO2011090440 A1 | 7/2011 |
| WO | WO2011163247 A2 | 12/2011 |

OTHER PUBLICATIONS

Invitation to Pay Additional Fees for International Patent Application No. PCT/US2011/049198 dated Nov. 7, 2011.

Magnus Sandell, et al. "Smooth Beamforming for OFDM," IEEE Transactions on Wireless Communications, vol. 8. No. 3, (Mar. 2009), pp. 1133-1138.

Xiantao Sun, et al., "Enhanced IEEE 802.11n Quantized Feedback Beamforming with Power Allocation," IEEE (2008), pp. 908-912.

Cong Shen et al., "MIMO-OFDM Beamforming for Improved Channel Estimation", IEEE Journal on Selected Areas in Communications, vol. 26, Issue: 6, pp. 948-959 (Aug. 2008).

International Search Report and Written Opinion—PCT/US2011/049198—ISA/EPO—Feb. 2, 2012.

Sandell, et al., "Smooth beamforming and efficient beamforming weight computation," Global Telecommunications Conference [Online], 2007, pp. 4076-4080.

* cited by examiner

BEAMFORMING FEEDBACK OPTIONS FOR MU-MIMO

CROSS-REFERENCE TO RELATED APPLICATION(S)

This application claims benefit of U.S. Provisional Patent Application Ser. Nos. 61/377,023, filed Aug. 25, 2010, and 61/377,787, filed Aug. 27, 2010, which are herein incorporated by reference.

TECHNICAL FIELD

Certain embodiments of the present disclosure generally relate to wireless communications and, more particularly, to wireless communications utilizing beamforming feedback options for multi-user multiple-input multiple-output (MU-MIMO).

BACKGROUND

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In wireless networks with a single access point and multiple stations, concurrent transmissions may occur on multiple channels toward different stations, both in the uplink and downlink directions. Many challenges are presented in such systems, such as the ability to communicate with legacy devices in addition to non-legacy devices, efficient use of resources, and interference.

SUMMARY

Certain aspects of the present disclosure provide a method for wireless communications. The method generally includes generating channel matrices for communication channels between a transmitter and a receiver, generating beamforming feedback by applying a smoothing process on eigenvector matrices obtained by Singular Value Decomposition (SVD) of the channel matrices, and transmitting the beamforming feedback.

Certain aspects provide an apparatus for wireless communications. The apparatus generally includes logic for generating channel matrices for communication channels between a transmitter and a receiver, logic for generating beamforming feedback by applying a smoothing process on eigenvector matrices obtained by SVD of the channel matrices, and logic for transmitting the beamforming feedback.

Certain aspects provide an apparatus for wireless communications. The apparatus generally includes means for generating channel matrices for communication channels between a transmitter and a receiver, means for generating beamforming feedback by applying a smoothing process on eigenvector matrices obtained by SVD of the channel matrices, and means for transmitting the beamforming feedback.

Certain aspects provide a computer-program product for wireless communications, comprising a computer-readable medium having instructions stored thereon, the instructions being executable by one or more processors. The instructions generally include instructions for generating channel matrices for communication channels between a transmitter and a receiver, instructions for generating beamforming feedback by applying a smoothing process on eigenvector matrices obtained by SVD of the channel matrices, and instructions for transmitting the beamforming feedback.

Certain aspects of the present disclosure provide a method for wireless communications. The method generally includes estimating a channel used to receive transmissions from an access point (AP), transmitting feedback to the AP, and transmitting an indication that maximum-likelihood (ML) detection or minimum mean square error (MMSE) detection is used for receiving the transmissions from the AP.

Certain aspects provide an apparatus for wireless communications. The apparatus generally includes logic for estimating a channel used to receive transmissions from an AP, logic for transmitting feedback to the AP, and logic for transmitting an indication that ML detection or MMSE detection is used for receiving the transmissions from the AP.

Certain aspects provide an apparatus for wireless communications. The apparatus generally includes means for estimating a channel used to receive transmissions from an AP, means for transmitting feedback to the AP, and means for transmitting an indication that ML detection or MMSE detection is used for receiving the transmissions from the AP.

Certain aspects provide a computer-program product for wireless communications, comprising a computer-readable medium having instructions stored thereon, the instructions being executable by one or more processors. The instructions generally include instructions for estimating a channel used to receive transmissions from an AP, instructions for transmitting feedback to the AP, and instructions for transmitting an indication that ML detection or MMSE detection is used for receiving the transmissions from the AP.

Certain aspects of the present disclosure provide a method for wireless communications. The method generally includes receiving beamforming feedback that is generated by a receiver by applying a smoothing process on eigenvector matrices obtained by SVD of channel matrices, and transmitting signals, to the receiver, based on the beamforming feedback.

Certain aspects provide an apparatus for wireless communications. The apparatus generally includes logic for receiving beamforming feedback that is generated by a receiver by applying a smoothing process on eigenvector matrices obtained by SVD of channel matrices, and logic for transmitting signals, to the receiver, based on the beamforming feedback.

Certain aspects provide an apparatus for wireless communications. The apparatus generally includes means for receiving beamforming feedback that is generated by a receiver by applying a smoothing process on eigenvector matrices obtained by SVD of channel matrices, and means for transmitting signals, to the receiver, based on the beamforming feedback.

Certain aspects provide a computer-program product for wireless communications, comprising a computer-readable medium having instructions stored thereon, the instructions being executable by one or more processors. The instructions generally include instructions for receiving beamforming feedback that is generated by a receiver by applying a smoothing process on eigenvector matrices obtained by SVD of channel matrices, and instructions for transmitting signals, to the receiver, based on the beamforming feedback.

Certain aspects of the present disclosure provide a method for wireless communications. The method generally includes receiving feedback that is generated by a receiver, receiving, from the receiver, an indication that ML detection or MMSE detection is used for reception, and transmitting signals, to the receiver, based on the feedback and the indication.

Certain aspects provide an apparatus for wireless communications. The apparatus generally includes logic for receiving feedback that is generated by a receiver, logic for receiving, from the receiver, an indication that ML detection or MMSE detection is used for reception, and logic for transmitting signals, to the receiver, based on the feedback and the indication.

Certain aspects provide an apparatus for wireless communications. The apparatus generally includes means for receiving feedback that is generated by a receiver, means for receiving, from the receiver, an indication that ML detection or MMSE detection is used for reception, and means for transmitting signals, to the receiver, based on the feedback and the indication.

Certain aspects provide a computer-program product for wireless communications, comprising a computer-readable medium having instructions stored thereon, the instructions being executable by one or more processors. The instructions generally include instructions for receiving feedback that is generated by a receiver, instructions for receiving, from the receiver, an indication that ML detection or MMSE detection is used for reception, and instructions for transmitting signals, to the receiver, based on the feedback and the indication.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Beamforming may be used in MIMO communication systems to further enhance spectral efficiency. Beamforming refers to beamed transmissions to a single destination (e.g., a station) at a time, to enhance the rate and/or range of transmission. To perform beamforming from a source to one or more destinations, a channel and/or beamforming matrices corresponding to the channel needs to be known at the source, which may be obtained as feedback from the destination. However, the beamforming matrices may not be smooth over frequency as it is fed back from the destination. Therefore, certain aspects of the present disclosure provide beamforming feedback options, resulting in the smoothness of a beamforming matrix.

Various aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that operate in compliance with 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
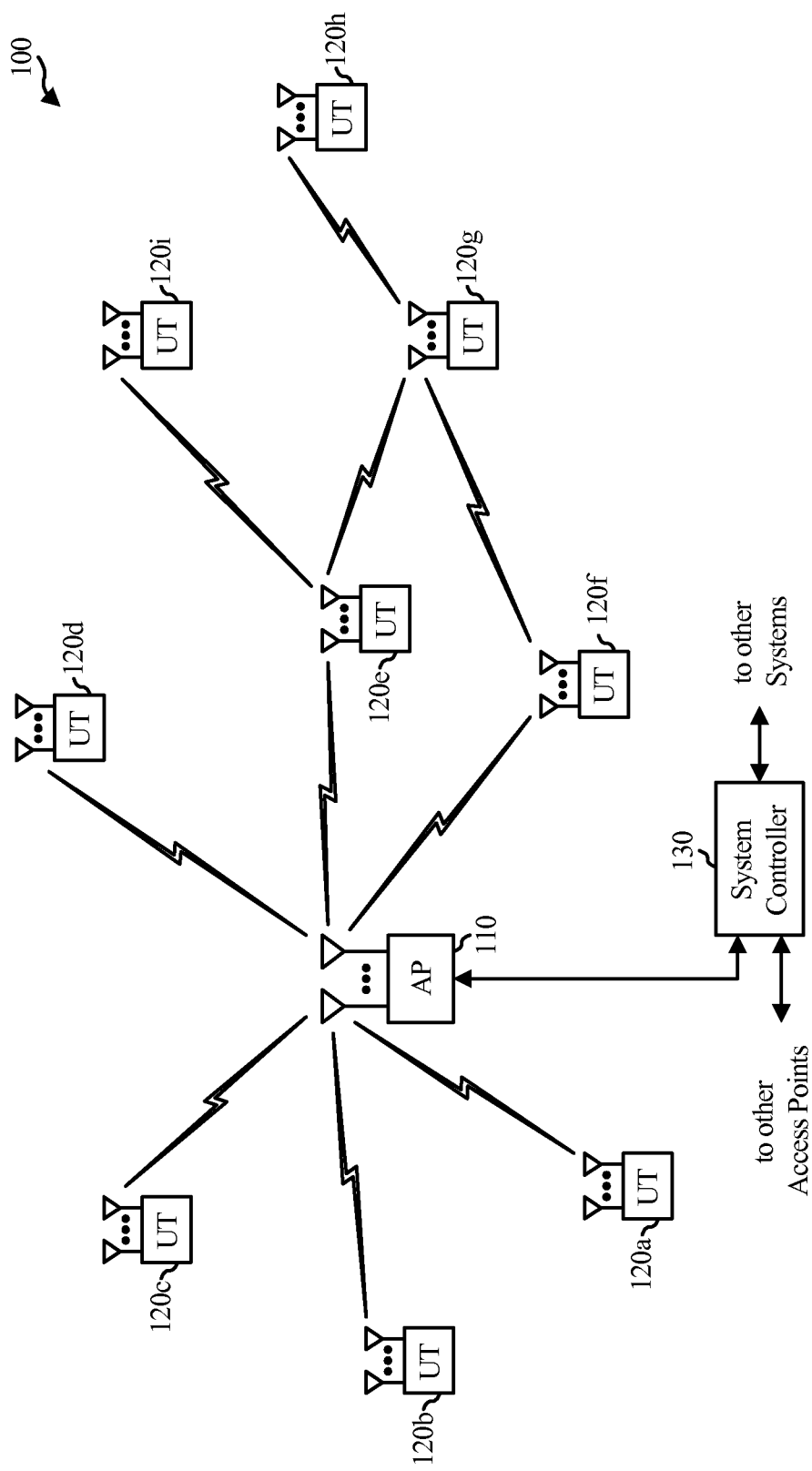
FIG. 1 illustrates a diagram of a wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. In case of SMDA or multi-user MIMO (MU-MIMO), a set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
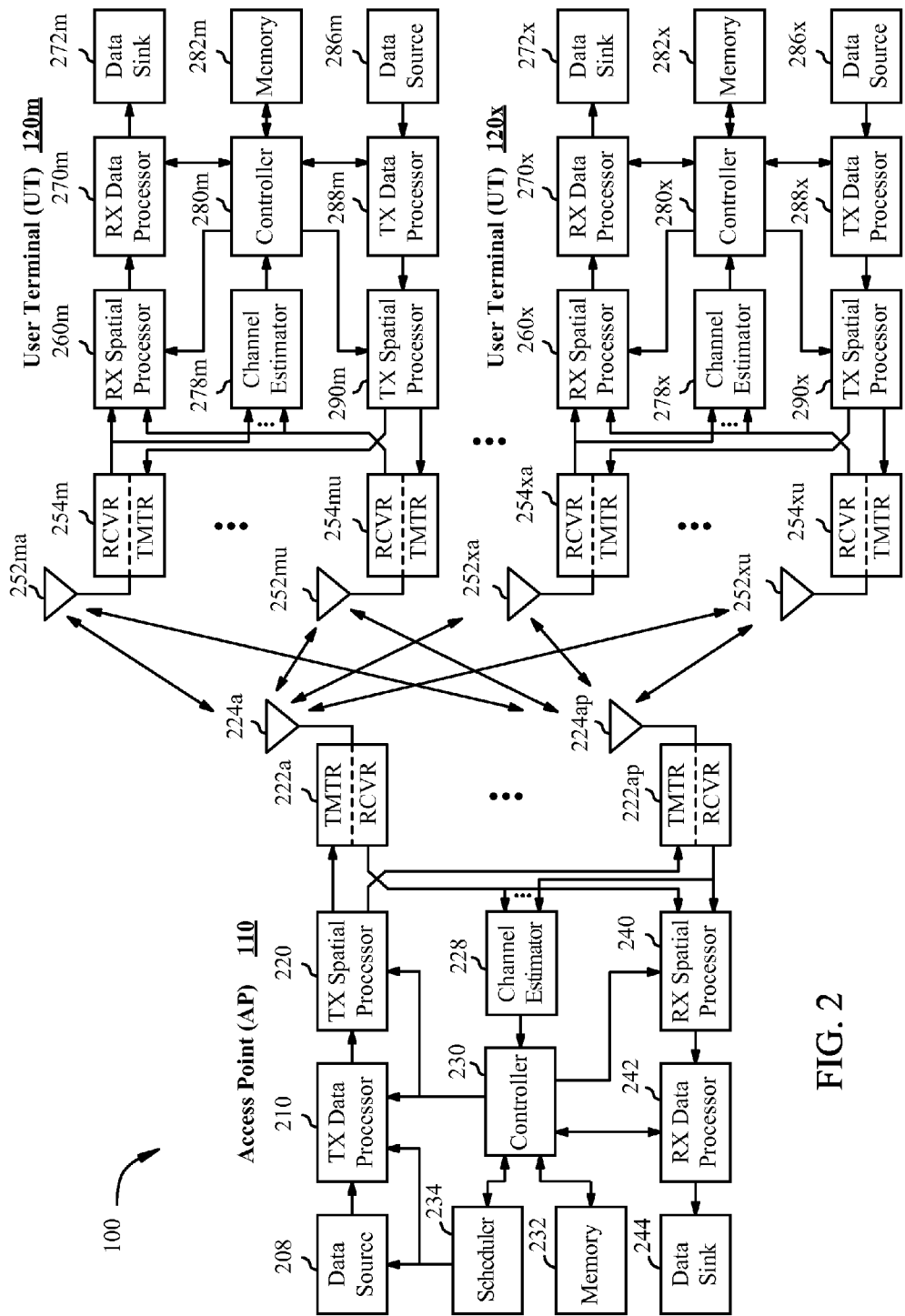
FIG. 2 illustrates a block diagram of an example access point and user terminals in accordance with certain aspects of the present disclosure.

FIG. 2 shows a block diagram of access point 110 and two user terminals 120*m* and 120*x* in MIMO system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{ap}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
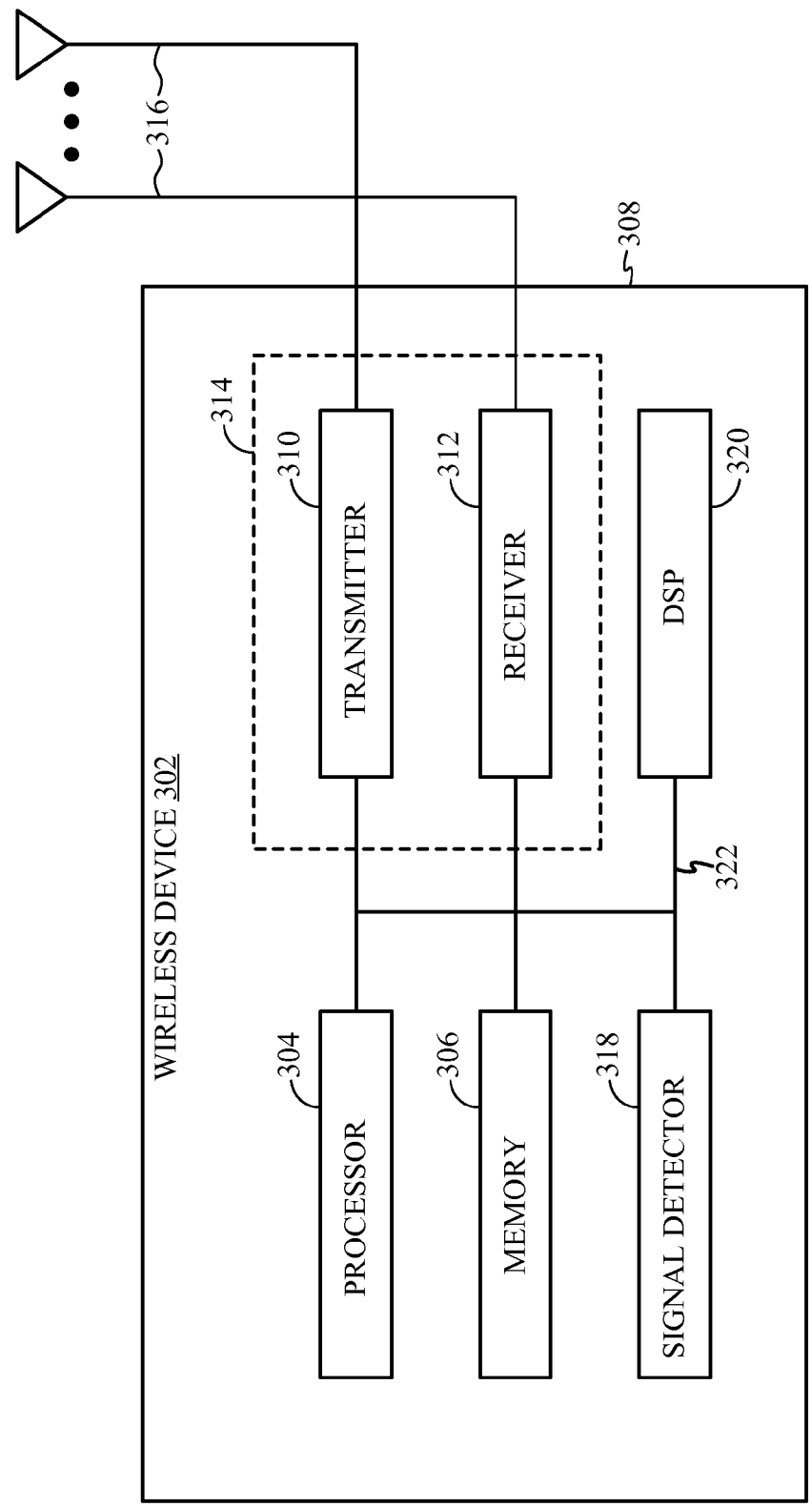
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 that controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof.

Beamforming Feedback Options for MU-MIMO

Beamforming and SDMA may be used in MIMO communication systems to further enhance spectral efficiency, particularly when stations support less spatial streams than an access point (AP). Beamforming may refer to beamed transmissions to a single destination (e.g., a station) at a time, to enhance the rate and/or range of transmission. Similarly, the term SDMA may refer to beamed transmissions to two or more destinations at the same time, particularly to enhance the network throughput when individual transmissions to each of the destinations are rate limited.

To perform beamforming or SDMA from a source to one or more destinations, a forward link channel H (i.e., the channel between the source and the destination) and/or beamforming matrices V corresponding to the forward link channel H needs to be known at the source. This channel knowledge may be obtained either explicitly or implicitly.

In the explicit method, the source may send a channel training sequence with proper spatial dimensions to the destinations that are targets of beamforming or SDMA transmissions. The destinations may estimate the forward link channel based on the received training sequence. Once the channel is estimated, the destinations may send the estimated forward link channel metrics to the source. The destination may calculate and transmit a beamforming matrix V (i.e., an eigenvector matrix) by performing a beamforming technique such as singular value decomposition (SVD) on the estimated forward link channel.

For beamforming or SDMA based on an implicit channel estimation method, the forward link channel may be implicitly determined by observing the reverse link channel at the source. Estimate of the reverse link channel may be transposed and, when necessary, corrected for any relative gain and phase differences in each receive and transmit chain pair to generate an estimate of the forward link channel. The relative gain and phase differences may be estimated through calibration. The implicit method may require an equal number of transmit and receive chains at the source.

For beamforming, forward link channel H may be utilized to calculate beamforming weights for the beamed transmissions to the destination (e.g., access terminal). Similarly, in SDMA, a composite forward link channel may be formed by stacking the forward link channels of different destinations that are part of the SDMA transmission.

Figure 4:
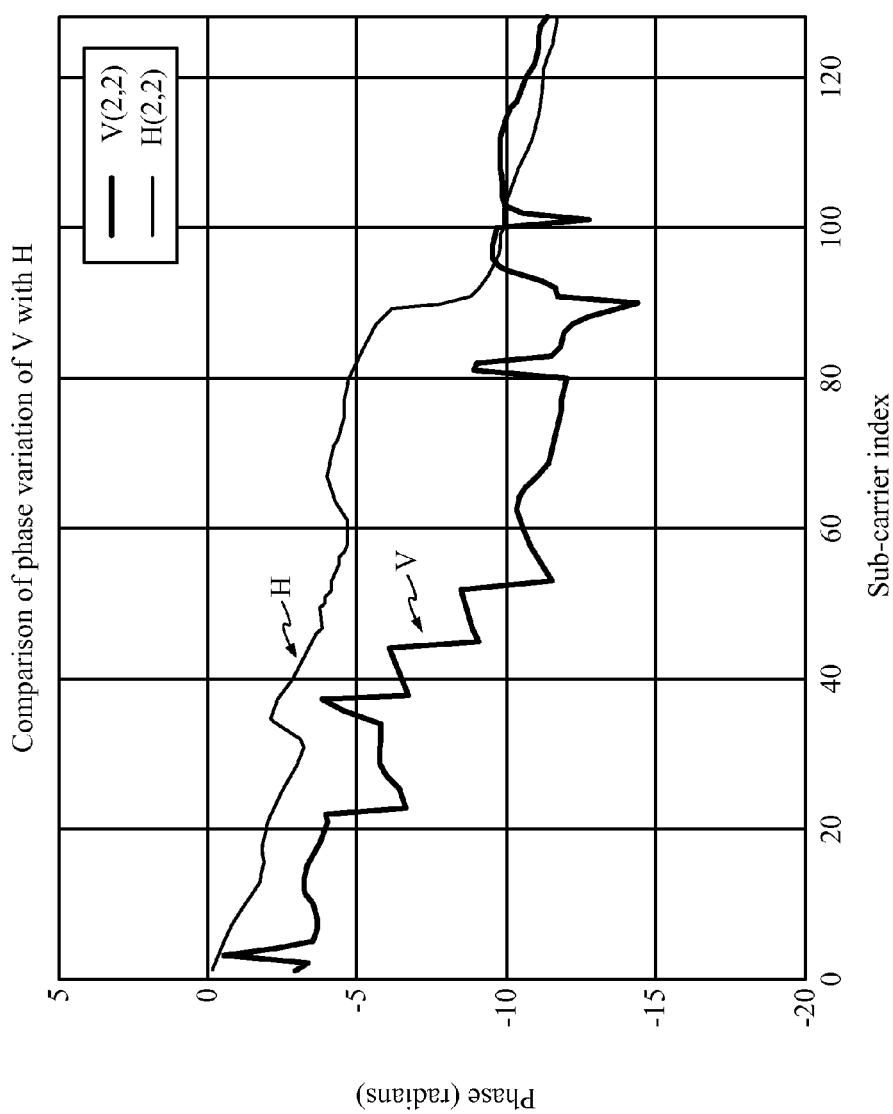
FIG. 4 illustrates a comparison of phase variation of an eigenvector matrix with a corresponding channel, in accordance with certain aspects of the present disclosure.

FIG. 4 illustrates a comparison of phase variation of an eigenvector matrix V with a corresponding channel H, in accordance with certain aspects of the present disclosure. The eigenvector matrix V may not be smooth over frequency, as illustrated in FIG. 4. FIG. 4 illustrates an example of a 4×4 channel D-NLOS channel for 40 MHz (i.e., non-line-of-sight channel of type D), comprising a phase of one element of channel H and the corresponding eigenvector V. V may have sudden jumps in phase. Therefore, linear interpolation of V may lead to poor performance.

V may not be smooth over frequency because eigenmodes may become circular at some point in the frequency domain, resulting in phase discontinuities in V around this point. Therefore, the smoothness of V may not be guaranteed. This may occur when the number of spatial streams is larger than 1 (i.e., Nss≥2) or when the feedback consists of only a subset of eigenvectors belonging to the strongest eigenmodes on each tone (i.e., known as a "rank-deficient" case).

In an effort to reduce feedback overhead, the destination may apply tone-grouping to the estimated forward link channel metrics. However, tone-grouping may result in considerable performance degradation in the case of the non-smooth eigenvector matrix V, as illustrated in FIG. 5.

Figure 5:
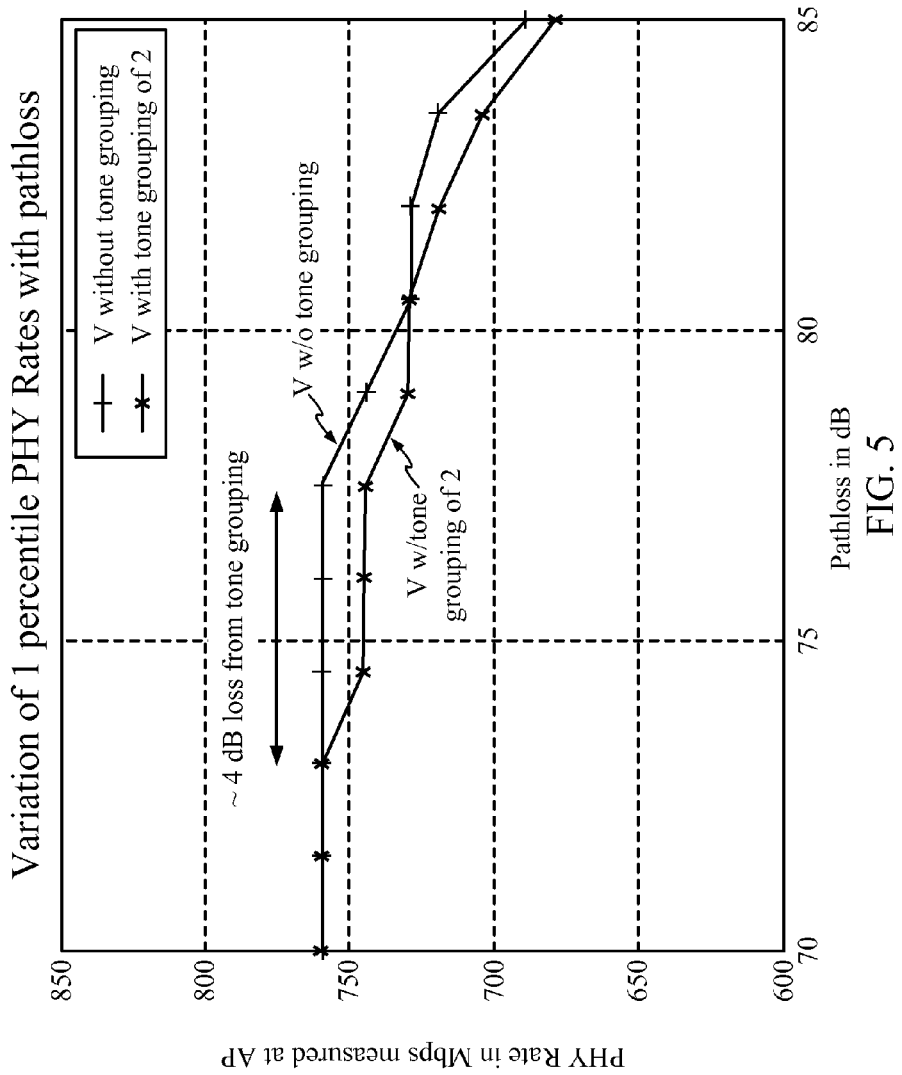
FIG. 5 illustrates a comparison of an eigenvector matrix with and without tone-grouping, in accordance with certain aspects of the present disclosure.

FIG. 5 illustrates a comparison of an eigenvector matrix V with and without tone-grouping, in accordance with certain aspects of the present disclosure. In the high signal to noise ratio (SNR) regime, around 4 dB may be lost from precoder interpolation. However, the loss may be even higher in packet error rate (PER) vs. SNR curves.

Simulation parameters for FIG. 5 comprise an eight antenna AP, three clients with three antennas each (2 spatial streams each), 64 QAM (rate 5/6) (i.e., quadrature amplitude modulation), Channel Model D, NLOS (results for 2,000 channel realizations), and two sources of channel state information (CSI) error at the AP (channel estimation floor at client and feedback delay error=−30 dBc).

Certain aspects of the present disclosure provide very high throughput (VHT) beamforming feedback options for MU-MIMO, resulting in the smoothness of an eigenvector matrix V. In other words, the beamforming feedback options may result in the reduction of phase discontinuities in the eigenvector matrix V.

For some embodiments, a smoothing process may be applied on eigenvector matrices V obtained by SVD of channel matrices H. The smoothing process may control the SVD operation of the channel matrix H on each subcarrier to generate smooth effective channels across all subcarriers.

Figure 6:
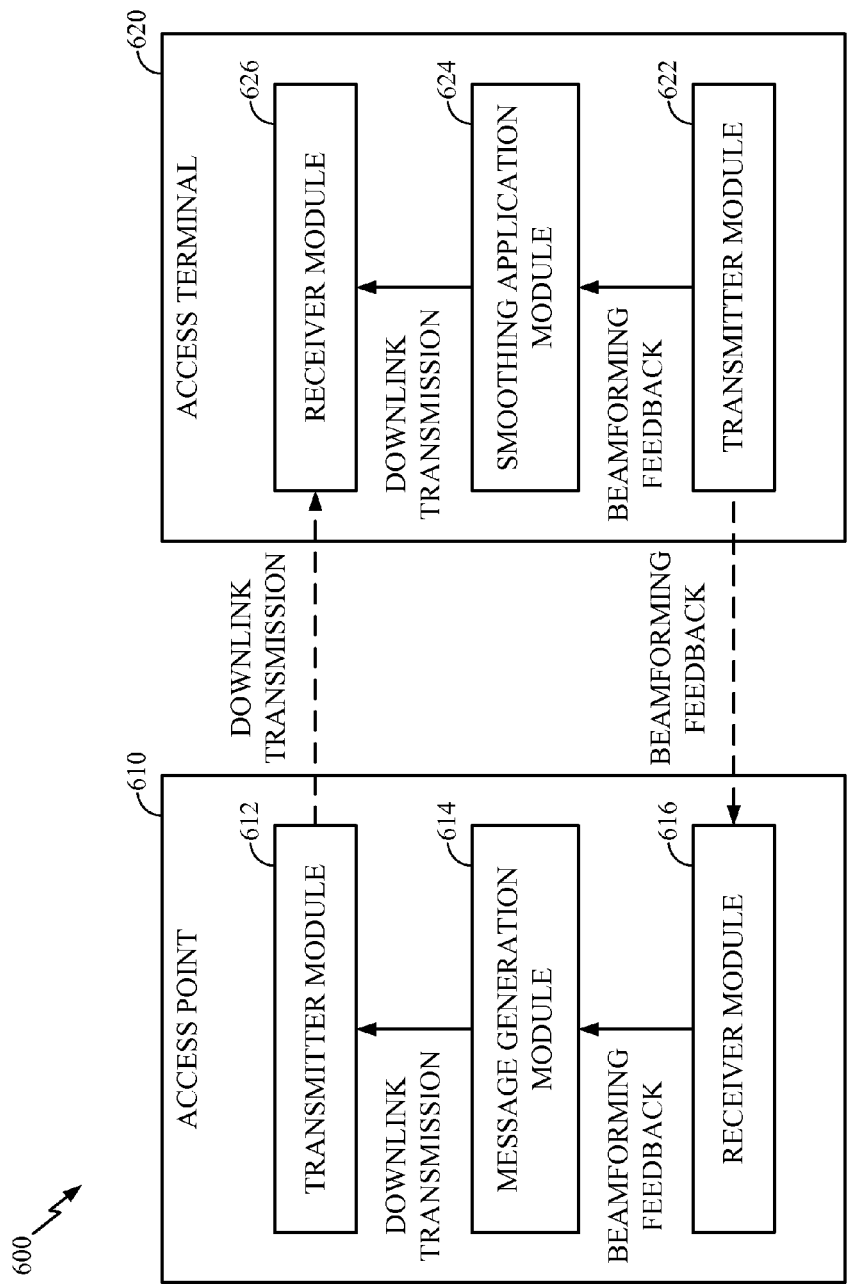
FIG. 6 illustrates an example system with an access point and an access terminal, capable of applying a smoothing process on beamforming feedback, in accordance with certain aspects of the present disclosure.

FIG. 6 illustrates an example system 600 with an access point 610 and an access terminal 620, capable of applying a smoothing process on beamforming feedback (e.g., eigenvector matrices V), in accordance with certain aspects of the present disclosure. As illustrated, the access point 610 may include a message generation module 614, for generating downlink transmissions (e.g., a channel training sequence for estimating a forward link channel). The downlink transmissions may be transmitted, via a transmitter module 612, to the access terminal 620.

The access terminal 620 may receive the channel training sequence via a receiver module 626 and estimate the forward link channel based on the received training sequence. A smoothing application module 624 may generate beamforming feedback by applying a smoothing process on eigenvector matrices obtained by SVD of the forward link channel. The access terminal 620 may transmit the beamforming feedback via a transmitter module 622. The access point 610 may receive the smoothed beamforming feedback via a receiver module 616.

Figure 7:
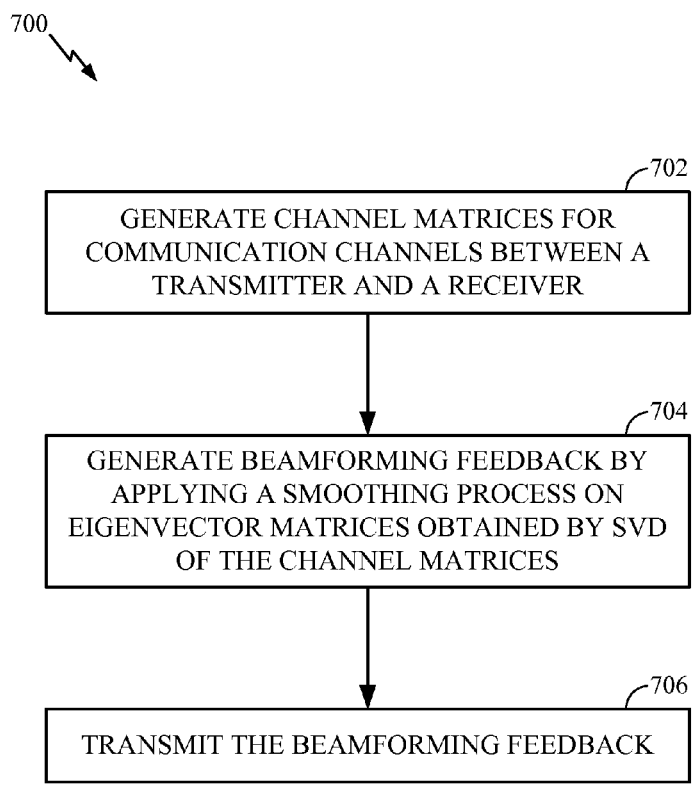
FIG. 7 illustrates example operations for transmitting beamforming feedback, in accordance with certain aspects of the present disclosure.

FIG. 7 illustrates example operations 700 for transmitting beamforming feedback, in accordance with certain aspects of the present disclosure. The operations 700 may be performed, for example, by an access terminal. At 702, the access terminal may generate channel matrices for communication channels between the access terminal and an access point (i.e., estimate the communication channels). At 704, the access terminal may generate beamforming feedback by applying a smoothing process on eigenvector matrices obtained by SVD of the channel matrices.

At 706, the access terminal may transmit the beamforming feedback. The feedback may comprise at least one of the eigenvector matrices per tone, a signal to noise ratio (SNR) per spatial stream, singular values per tone, an SNR per tone, and any compressed representation thereof, optionally followed by a tone-grouping or subsampling.

For some embodiments, a subset of the eigenvectors matrices may be fed back on each tone. However, this may lead to suboptimal performance. Some performance gain may be achieved when the best subset averaged over tones is fed back. For example, if after smoothing or unordering the SVD, for a given metric, eigenmode 2 and 3 out of three eigenmodes in total averaged over tones, show the best performance, then eigenvector 2 and 3 may be fed back for each tone. The best subset may be determined using metrics comprising an average power of eigenvalues across all the tones, an average signal to interference and noise ratio (SINR) per spatial stream across all the tones, and/or a lowest mean-square error after interpolation of a tone-grouped subset. In addition, tone grouping and 802.11n-like compression may be applied to further reduce the feedback overhead.

For some embodiments, after applying the smoothing process at 704, the full-dimensional eigenvector matrix may be fed back. Tone grouping and 802.11n-like compression may be applied to further reduce the feedback overhead. The access point may select a subset of eigenvectors corresponding to a subset of eigenmodes after interpolating the tone-grouped feedback when less spatial streams than available eigenmodes are scheduled to be sent to the given terminal.

Figure 8:
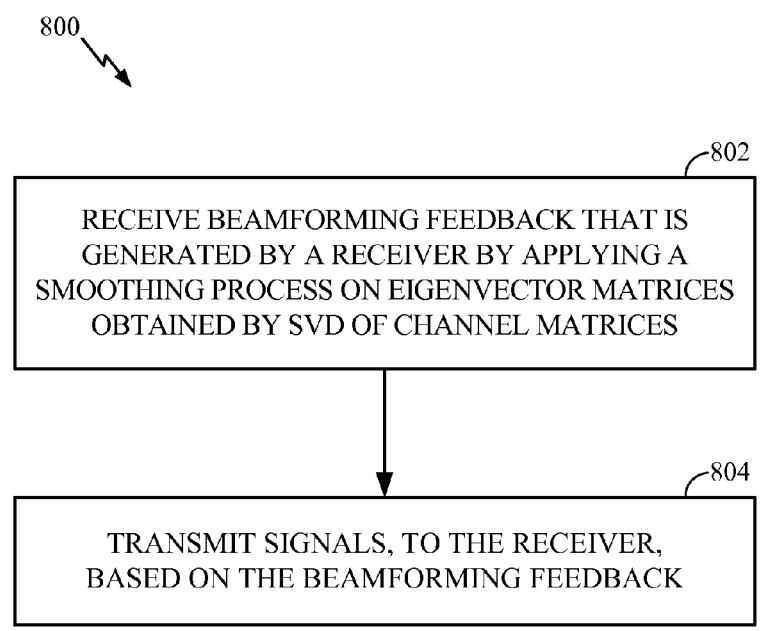
FIG. 8 illustrates example operations for transmitting signals based on a smoothed beamforming feedback, in accordance with certain aspects of the present disclosure.

FIG. 8 illustrates example operations 800 for transmitting signals (i.e., beamforming) based on a smoothed beamforming feedback, in accordance with certain aspects of the present disclosure. The operations 800 may be performed, for example, by an access point. At 802, the access point may receive beamforming feedback that is generated by an access terminal, as described with reference to FIG. 7.

At 804, the access point may transmit signals (e.g., beamformed signals), to the access terminal, based on the smoothed beamforming feedback received from the access terminal. For some embodiments, the feedback may comprise a full-dimensional eigenvector matrix, and the access point may select a subset of eigenvectors corresponding to a subset of eigenmodes to be sent to the access terminal, after interpolating the tone-grouped feedback.

For some embodiments, VHT beamforming feedback options comprise using feedback such as channel state information (CSI) feedback for smoothing an eigenvector matrix V. The CSI feedback may be extended with an indication that an access terminal is using maximum-likelihood (ML) detection or minimum mean square error (MMSE) detection during reception. If ML detection is used, in case of beamforming/SDMA, at least one spatial stream less than the available eigenmodes to the access terminal may be used. Otherwise, open-loop-like transmissions may be used, where beamforming may not be applied. However, if MMSE detection is used, there may be no constraints, and beamforming may be applied.

Figure 9:
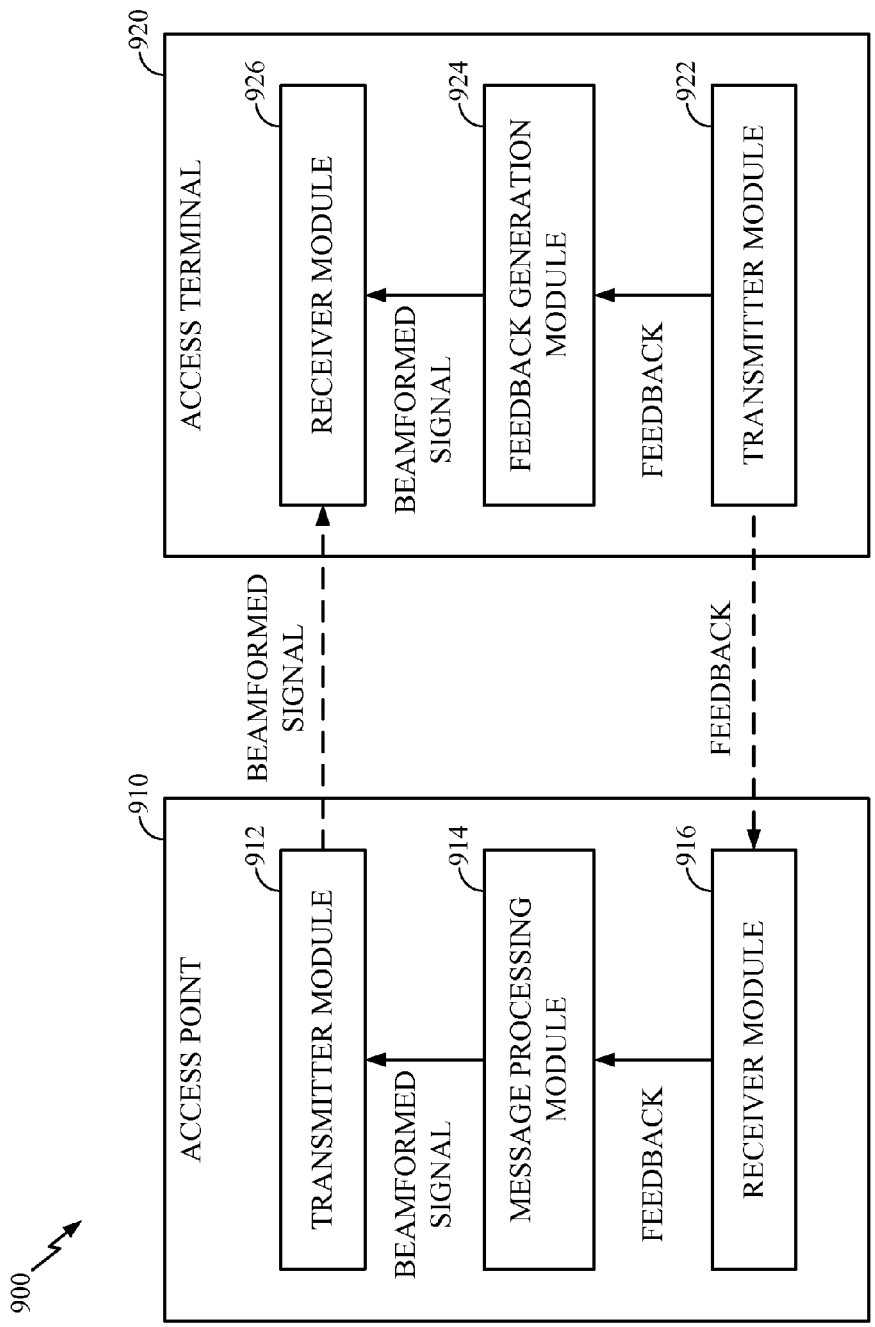
FIG. 9 illustrates an example system with an access point and an access terminal, capable of smoothing an eigenvector matrix by using feedback such as channel state information (CSI) feedback, in accordance with certain aspects of the present disclosure.

FIG. 9 illustrates an example system 900 with an access point 910 and an access terminal 920, capable of smoothing an eigenvector matrix V by using feedback such as CSI feedback or V feedback in a compressed or non-compressed form, in accordance with certain aspects of the present disclosure. As illustrated, the access terminal 920 may include a feedback generation module 924, for estimating a channel between the access point 910 and the access terminal 920 and generating the feedback. The feedback may comprise an indication whether the access terminal 920 is using ML detection or MMSE detection during reception. The feedback (and indication) may be transmitted, via a transmitter module 922, to the access point 910.

The access point 910 may receive the feedback via a receiver module 916 and process the feedback via a message processing module 914. After receiving and processing the feedback, the access point 910 may transmit beamformed signals via a transmitter module 912, based on the feedback and the indication. The access terminal 920 may receive the beamformed signals via a receiver module 926.

Figure 10:
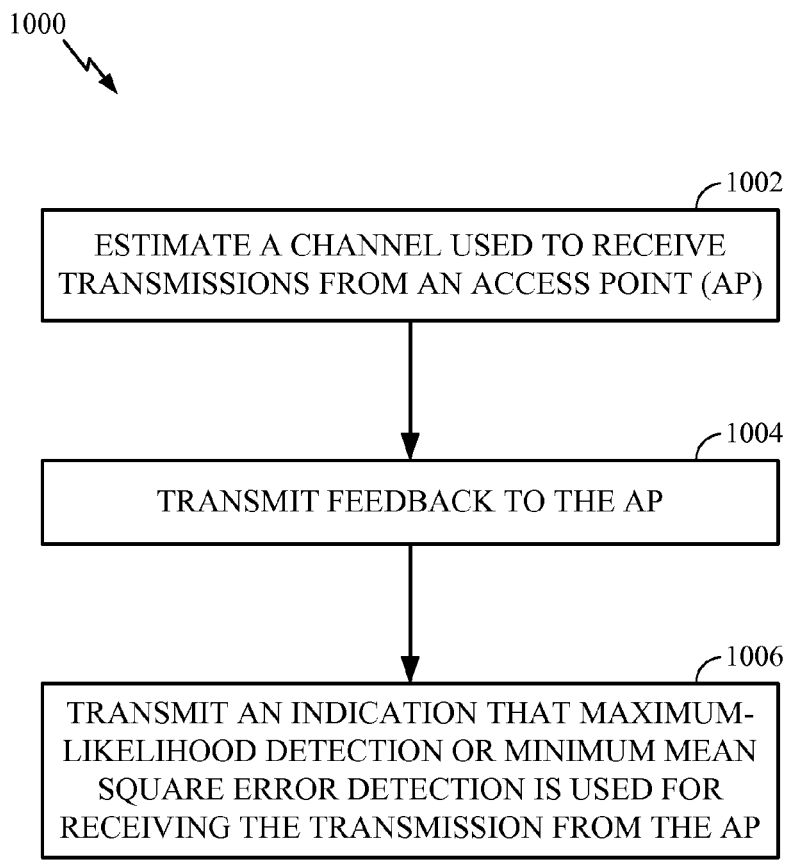
FIG. 10 illustrates example operations for transmitting CSI feedback, in accordance with certain aspects of the present disclosure.

FIG. 10 illustrates example operations 1000 for transmitting feedback, in accordance with certain aspects of the present disclosure. The operations 1000 may be performed, for example, by an access terminal. At 1002, the access terminal may estimate a channel used to receive transmissions from an access point. At 1004, the access terminal may transmit feedback to the access point. At 1006, the access terminal may transmit an indication that ML detection or MMSE detection is used for receiving the transmissions from the AP.

Figure 11:
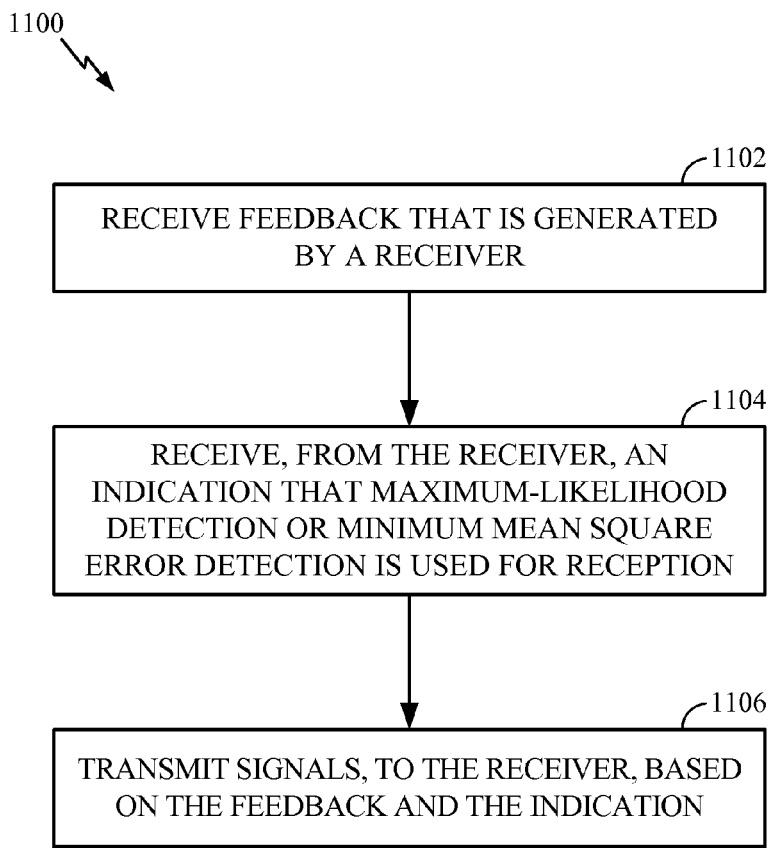
FIG. 11 illustrates example operations for transmitting signals based on CSI feedback, in accordance with certain aspects of the present disclosure.

FIG. 11 illustrates example operations 1100 for transmitting signals based on feedback, in accordance with certain aspects of the present disclosure. The operations 1100 may be performed, for example, by an access point. At 1102, the access point may receive feedback that is generated by an access terminal. At 1104, the access point may receive, from the access terminal, an indication that ML detection or MMSE detection is used for reception. At 1106, the access point may transmit signals, to the access terminal, based on the feedback and the indication (i.e., determine how many spatial streams to beamform based on the indication received).

The various operations of methods described above may be performed by various hardware and/or software component(s). As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
   generating channel matrices for communication channels between a transmitter and a receiver;
   generating beam forming feedback by applying a smoothing process on eigenvector matrices obtained by Singular Value Decomposition (SVD) of the channel matrices; and
   transmitting the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

2. The method of claim 1, wherein the feedback comprises at least one of the eigenvector matrices per tone, a signal to noise ratio (SNR) per spatial stream, singular values per tone, an SNR per tone, and any compressed representation thereof.

3. The method of claim 2, wherein tone-grouping or subsampling is applied to the feedback.

4. The method of claim 1, wherein the feedback comprises a full-dimensional eigenvector matrix.

5. An apparatus for wireless communications, comprising:
   logic for generating channel matrices for communication channels between a transmitter and a receiver;
   logic for generating beamforming feedback by applying a smoothing process on eigenvector matrices obtained by Singular Value Decomposition (SVD) of the channel matrices; and
   logic for transmitting the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

6. The apparatus of claim 5, wherein the feedback comprises at least one of the eigenvector matrices per tone, a signal to noise ratio (SNR) per spatial stream, singular values per tone, an SNR per tone, and any compressed representation thereof.

7. The apparatus of claim 6, wherein tone-grouping or subsampling is applied to the feedback.

8. The apparatus of claim 5, wherein the feedback comprises a full-dimensional eigenvector matrix.

9. An apparatus for wireless communications, comprising:
   means for generating channel matrices for communication channels between a transmitter and a receiver;
   means for generating beam forming feedback by applying a smoothing process on eigenvector matrices obtained by Singular Value Decomposition (SVD) of the channel matrices; and
   means for transmitting the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

10. The apparatus of claim 9, wherein the feedback comprises at least one of the eigenvector matrices per tone, a signal to noise ratio (SNR) per spatial stream, singular values per tone, an SNR per tone, and any compressed representation thereof.

11. The apparatus of claim 10, wherein tone-grouping or subsampling is applied to the feedback.

12. The apparatus of claim 9, wherein the feedback comprises a full-dimensional eigenvector matrix.

13. A computer-program product for wireless communications, comprising a non-transitory computer-readable medium having instructions stored thereon, the instructions being executable by one or more processors and the instructions comprising:
   instructions for generating channel matrices for communication channels between a transmitter and a receiver;
   instructions for generating beamforming feedback by applying a smoothing process on eigenvector matrices obtained by Singular Value Decomposition (SVD) of the channel matrices; and
   instructions for transmitting the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

14. The computer-program product of claim 13, wherein the feedback comprises at least one of the eigenvector matrices per tone, a signal to noise ratio (SN R) per spatial stream, singular values per tone, an SNR per lone, and any compressed representation thereof.

15. The computer-program product of claim 14, wherein tone-grouping or subsampling is applied to the feedback.

16. The computer-program product of claim 13, wherein the feedback comprises a full-dimensional eigenvector matrix.

17. A method for wireless communications, comprising:
   receiving beam forming feedback that is generated by a receiver by applying a smoothing process on eigenvector matrices obtained by Singular Value Decomposition (SVD) of channel matrices; and
   transmitting signals, to the receiver, based on the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

18. The method of claim 17, wherein the feedback comprises a full-dimensional eigenvector matrix.

19. An apparatus for wireless communications, comprising:
   logic for receiving beam forming feedback that is generated by a receiver by applying a smoothing process on eigenvector matrices obtained by Singular Value Decomposition (SVO) of channel matrices; and
   logic for transmitting signals, to the receiver, based on the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

20. The apparatus of claim 19, wherein the feedback comprises a full-dimensional eigenvector matrix.

21. An apparatus for wireless communications, comprising:
    means for receiving beamforming feedback that is generated by a receiver by applying a smoothing process on eigenvector matrices obtained by Singular Value Decomposition (SVD) of channel matrices; and
    means for transmitting signals, to the receiver, based on the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

22. The apparatus of claim 21, wherein the feedback comprises a full-dimensional eigenvector matrix.

23. A computer-program product for wireless communications, comprising a non-transitory computer-readable medium having instructions stored thereon, the instructions being executable by one or more processors and the instructions comprising:
    instructions for receiving beam forming feedback that is generated by a receiver by applying a smoothing process on eigenvector matrices obtained by Singular Value Decomposition (SVD) of channel matrices; and
    instructions for transmitting signals, to the receiver, based on the beamforming feedback, wherein the feedback comprises a subset of the eigenvector matrices corresponding to a subset of eigenmodes, and wherein the subset of the eigenvector matrices is determined using metrics comprising at least one of an average power of eigenvalues across all tones, an average signal to interference and noise ratio (SINR) per spatial stream across all the tones, and a lowest mean-square error after interpolation of a tone-grouped subset.

24. The computer-program product of claim 23, wherein the feedback comprises a full-dimensional eigenvector matrix.

25. The computer-program product of claim 24, further comprising:
    instructions for selecting a subset of eigenvectors corresponding to a subset of eigenmodes to be used when less spatial streams than available eigenmodes are scheduled for transmission.

* * * * *